Figure 1:
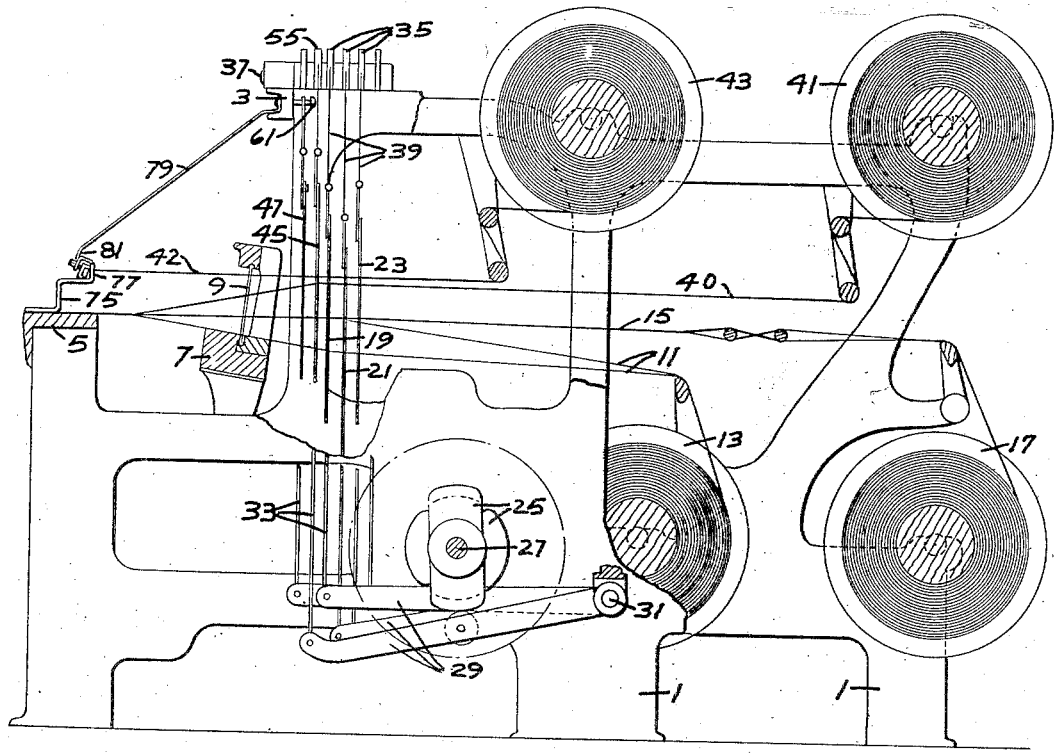

V. P. THEWLIS, D. G. MELVILLE AND R. A. TAYLOR.
ART OF WEAVING RUGS AND OTHER FABRICS.
APPLICATION FILED AUG. 30, 1919.

1,358,038.

Patented Nov. 9, 1920.

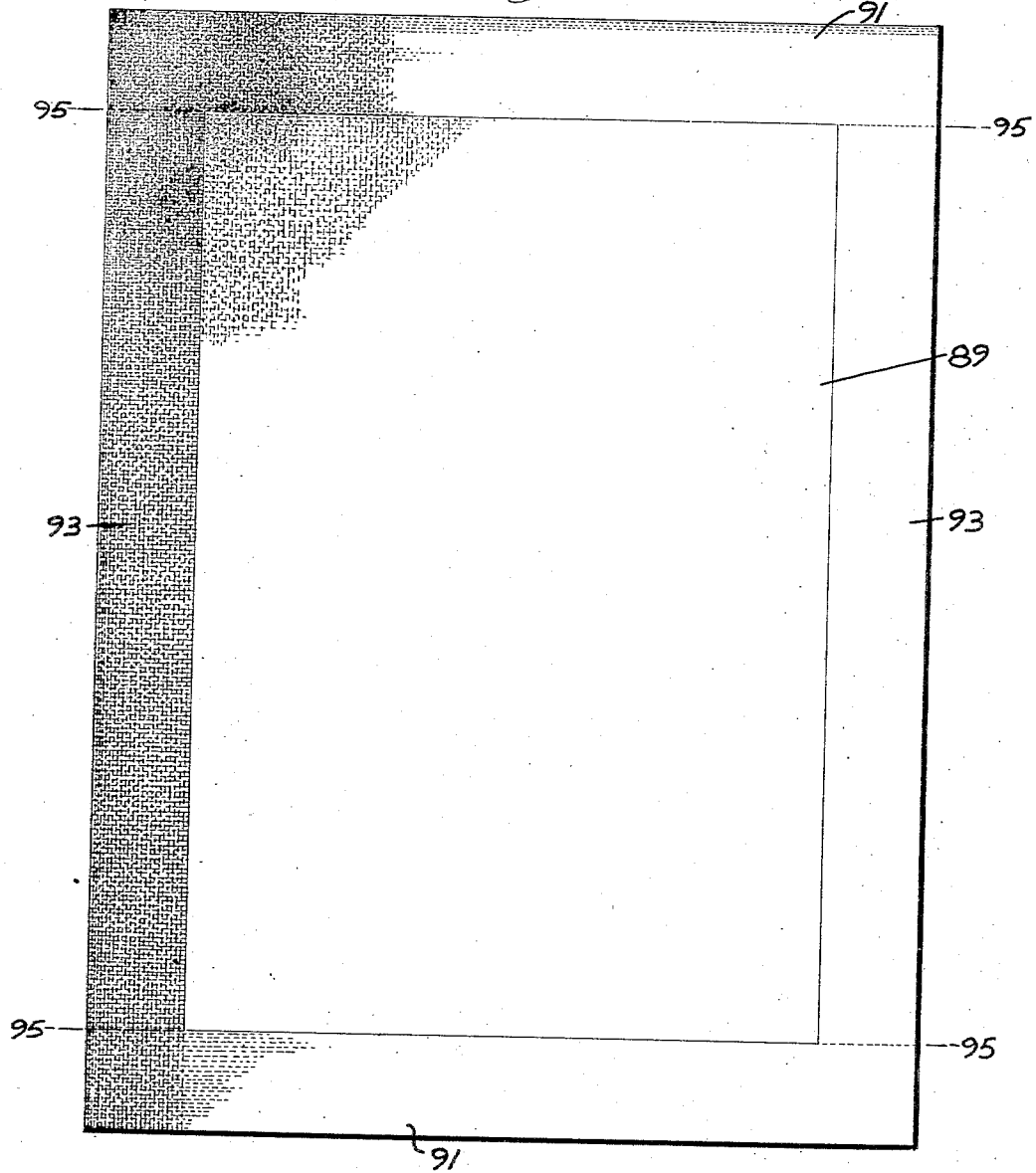

UNITED STATES PATENT OFFICE.

VICTOR P. THEWLIS, OF BROOKLINE, DAVID G. MELVILLE, OF MEDFORD, AND ROBERT A. TAYLOR, OF SAXONVILLE, MASSACHUSETTS, ASSIGNORS TO ROXBURY CARPET COMPANY, OF BOSTON, MASSACHUSETTS, A CORPORATION OF MASSACHUSETTS.

ART OF WEAVING RUGS AND OTHER FABRICS.

1,358,038. Specification of Letters Patent. Patented Nov. 9, 1920.

Application filed August 30, 1919. Serial No. 320,810.

*To all whom it may concern:*

Be it known that we, VICTOR P. THEWLIS, a subject of the King of Great Britain, DAVID G. MELVILLE, a citizen of the United States, and ROBERT A. TAYLOR, a citizen of the United States, residents of Brookline, county of Norfolk; Medford, county of Middlesex, and Saxonville, county of Middlesex, and State of Massachusetts, respectively, have invented an Improvement in the Art of Weaving Rugs and other Fabrics, of which the following description, in connection with the accompanying drawings, is a specification, like characters on the drawings representing like parts.

The invention to be hereinafter described relates to the art of weaving, and more particularly to an improved method of weaving rugs or other fabrics.

Heretofore in weaving rugs having a body of one color and an end border of a different color, it has been the practice to print warps forming the surface of the cloth, a color for a distance corresponding to the length of the body of the rug, and to print the warps a different color for distances corresponding to the width of the end borders of the rug. That is, continuous warps have been used in the production of the body and borders of the rug.

It has been found impossible to gage the printing so as accurately to produce a sharply defined design, since there are disturbing factors, such as the take-up, the length of the warps, variations in tension, etc., which prevent the points on the warps, where the change occurs from the color for the body to the color for the end border, from lying on the same straight line. As a consequence, the line of juncture of the body with the border has been irregular and indefinite.

One of the purposes of the present invention, therefore, is to produce a rug or fabric which will have a clear cut line of juncture between portions thereof such, for example, as between the body and end borders of the rug or fabric. In carrying this purpose into practical effect, certain warps are used for the body and separate and independent warps are used for the end borders, the former being supplied by one beam, and the latter being supplied by another beam. These warps are alternatively manipulated in the weaving operation, the body warps being idle while the border warps are active, and vice versa. By the use of separate warps for the body and end borders, the change from warps of one color to warps of another color may occur on a sharply defined straight line, thereby resulting in a rug having an appearance much improved over that of rugs produced by the warp printing method heretofore commonly employed.

Also by the new method, since one warp beam supplies the body warp and another warp beam supplies the end border warp, rugs of greater length, or a greater number of rugs than heretofore possible, can be woven without change of warp beams.

The character of the invention may be best understood by reference to the following description of an improved form of loom by which the method of making the rug embodying the invention may be practised, said loom being shown in the accompanying drawings, wherein:—

Figure 2:
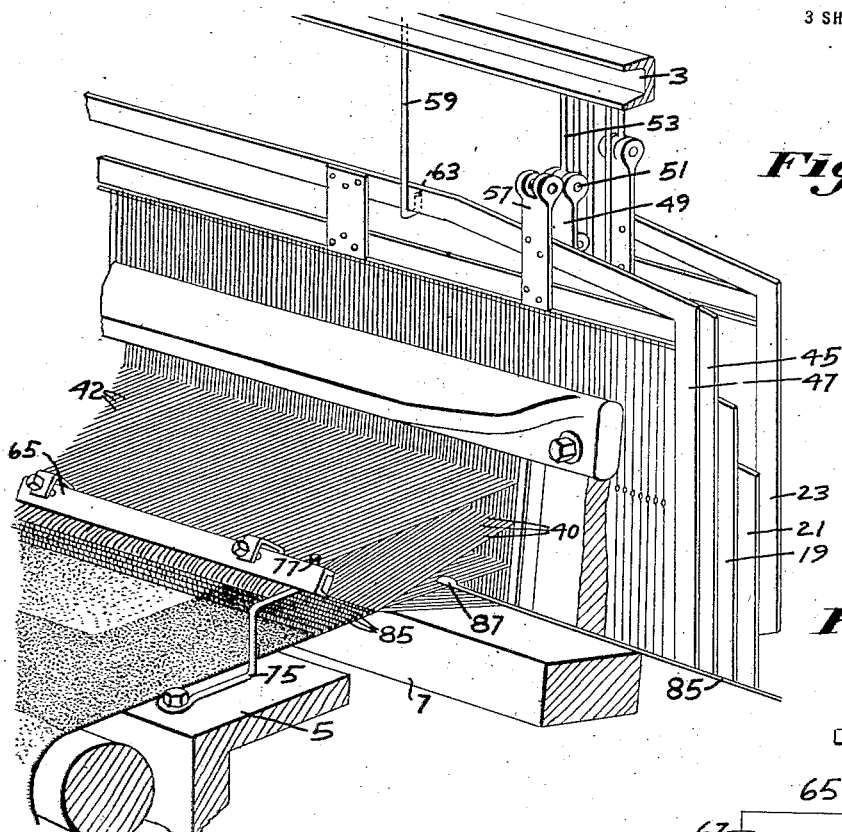
Figure 4:
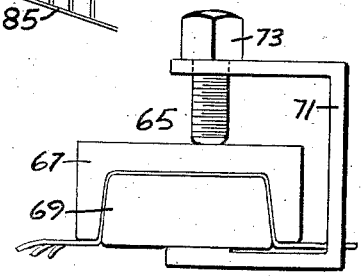
Figure 3:
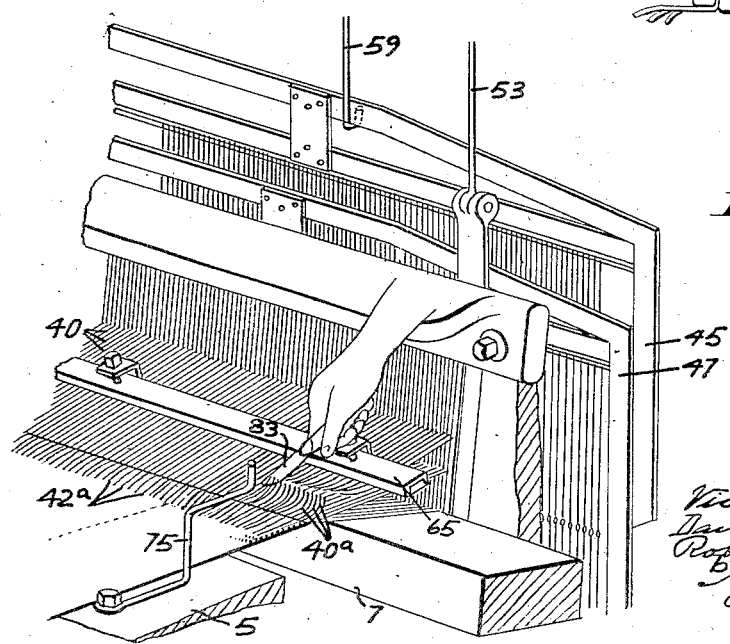

Figure 1 is a view partly in side elevation and partly in section showing so much of a loom as is necessary to illustrate the invention;

Fig. 2 on an enlarged scale is a perspective view of a portion of the loom shown in Fig. 1;

Fig. 3 is a perspective view of parts appearing in Fig. 2, but in a different position;

Fig. 4 on an enlarged scale is an end view of a clamping device for holding the ends of one set of warps when idle; and Fig. 5 is a plan of a rug which may be produced by the method.

Looms for producing various weaves may be employed in the practice of the method, but for purposes of illustration, a loom is shown herein for weaving warp pile fabrics.

This loom comprises side frames 1 held in spaced relation by suitable girts. Mounted on said side frames are the arch beam 3 and breast beam 5. The lay 7 having the reed 9 is constructed and operated as usual.

The warps 11 for the ground or foundation of the fabric are supplied by a warp beam 13, and the wadding or stuffing warps 15 are supplied by the warp beam 17. Harnesses 19 and 21 are provided for the ground or foundation warps, and a harness 23 is provided for the wadding or stuffing warps. These harnesses may be raised or lowered by cams 25 on a cam shaft 27 and coöperating with treadles 29 fulcrumed on a shaft 31, said treadles being connected by rods 33 with rock levers 35 on a shaft 37 supported on the arch beam 3 referred to, said levers in turn being connected by rods 39 with the harnesses. Since the cams, harnesses and the operating connections between them may be of usual construction, it is unnecessary to show and describe the same in detail herein. The construction is such that the ground warps and wadding warps are raised and lowered to perform the shedding operation in the usual manner for the production of the ground fabric for a warp pile weave.

Heretofore, in weaving warp pile rugs having body warps of one color and end border warps of a different color, the warps have been printed appropriately for the body and end borders, continuous warps being used, supplied from one warp beam or a plurality of warp beams mounted on the same shaft, and carried through from end to end of the rug. As stated, in accordance with the present method, however, one set of warps is used for weaving the body, and separate and independent warps are used in weaving the end borders of the rug, the end border warps being idle while the body warps are active, and vice versa.

To supply the body pile warps 40, a warp beam 41 may be mounted on the side frames of the loom, and to supply the end border pile warps 42, a warp beam 43 may be mounted on the side frames of the loom conveniently above the ground warp beam 13 and wadding warp beam 17 referred to. A harness 45 may be provided for the body warps, and a harness 47 may be provided for the end border warps. The harnesses 45 and 47 are alternately active in the weaving operation, and the same cam and connections may be employed to raise and lower said harnesses. Suitable means may be provided detachably to connect the harnesses 45 and 47 to the operating mechanism therefor. To accomplish this, in the present instance, the harness 45 is provided with a pair of straps 49 adjacent opposite ends thereof adapted to be connected by screw bolts 51 with rods 53 depending from the rock levers 55 of said operating mechanism.

Similarly, the harness 47 may be provided with a pair of straps 57 adjacent the opposite ends thereof adapted to be connected by bolts 51 to the rods 53 when the harness 47 is to be active in the weaving operation instead of the harness 45.

Suitable means may be provided to support the body and end border harnesses when they are inactive. To accomplish this, in the present instance, a pair of hangers 59 are provided depending from bolts 61 secured to the arch beam 3 referred to, said hangers being provided with hooks 63 at the lower ends thereof adapted to engage the upper frame members of the harnesses and support the same.

Suitable means may be provided to hold the ends of the body and end border pile warps when they are inactive. To accomplish this, in the present instance of the invention, a clamping device 65 may be provided comprising a channel 67 (Fig. 4) and a bar 69 adapted to fit into said channel and be held therein by a series of U-shaped clamps 71 provided with screw bolts 73. To secure the clamping device to the warps, the channel and bar may be presented at the opposite sides of the warps, and the bar 69 may be pressed into the channel. Then the U-shaped clamps 71 may be applied and secured by tightening the screws 73, thereby securely gripping the warps between said channel and bar.

Suitable means may be provided to support the clamping device in position to hold the idle warps a sufficient distance above the cloth to avoid interference with the weaving operation. To accomplish this, in the present instance, a pair of brackets 75 are mounted on the breast beam 5 and provided with upturned ends 77. To contribute to the support of the clamping device, an inclined bar 79 may be provided intermediate the bracket 75, and have its upper end secured to the arch beam 3. The lower end of the bar 79 may have a hook 81 to receive the clamping device.

In Fig. 2 the loom is shown in condition for weaving the body of the rug. The ends of the end border warps are secured to the clamping device 65 supported by the brackets 75 in a position such that the border warps are held a substantial distance above the cloth, and the harness 47 for the border warps is supported in inoperative position by the hangers 59. The harness 45 for the body warps is connected to the cam operated mechanism, and is active in the weaving operation.

With the parts of the loom in this condition, the weaving continues until a body of the length desired is completed. Thereupon, the body pile warps should be cut out, and the end border warps should be introduced. To accomplish this, the harness 45 for the body pile warps is disconnected from the shedding mechanism and supported on the hangers 59, and the harness 47 for the end border pile warps is lifted from the hangers and connected to the shedding mechanism, which was formerly connected to the harness 45.

Then the clamping device is lifted from the brackets 75 and the hook of the inclined bar 79 and lowered down to the cloth, thereby superposing the border warps on the cloth with the ends 42ª (Fig. 3) thereof projecting, for example, two or three inches beyond the fell of the cloth. The loom may then be operated to throw one or two picks to secure the end border warps to the cloth. After this has been done, the clamping device is secured to the border warps a substantial distance from the fell of the cloth, as will be noted in Fig. 3. Then the body warps may be severed by a knife 83 or other suitable instrument along a line between the clamping device and the fell of the cloth, the loose end portions 40ª of the warps projecting from the cloth being turned over onto the cloth. The clamping device may then be raised, brought forward and placed upon the brackets 75 back of the upstanding ends thereof, and seated in the hook 81 of the inclined bar 79. The loom may then be started and several picks thrown to commence weaving the end border warps. Then the loose ends of the body and end border warps may be cut off close to the cloth manually by scissors. The weaving of the end border may then continue until completed.

The change from end border to body warps may be made in a manner similar to that already described, it being understood, of course, that the body warps are substituted for the end border warps.

If a cut pile fabric is to be produced, the usual rods 85 may be employed, provided with knives 87 and operated by mechanism well understood in the art, and therefore, unnecessary to show and describe herein.

It will be understood that the pile warps for the production of the side borders of the rug will be supplied by the same beam which supplies the body warps, but, of course, will be of a different color.

Referring to Fig. 5, the rug shown therein is made in accordance with the method embodying the invention, and comprises a body 89, the end borders 91 and side borders 93, the end borders meeting the body and side borders on lines indicated by the dotted lines 95—95.

By the aforesaid method, the change from body pile warps to border pile warps may be quickly and readily made, and since the body and end border warps are separate and independent, the change from one to the other will occur on the sharply defined straight lines 95—95, and a rug will be produced which is much superior to the rug made by the warp printing method as hitherto practised. After the weaving of the rug has been completed as described, the rug may be put through the usual shearing machine, which completely eliminates the appearance of lines of juncture between the end borders and side borders of the rug.

While the method has been described more particularly with reference to the weaving of the body and end borders of a rug, it will be understood that the separate and independent surface pile warps may be successively brought into play in accordance with the method for the production of transverse stripes with a well defined straight line of juncture between them, or for the production of other designs within the scope of the invention.

What is claimed is:—

1. A method of weaving warp-pile rugs, characterized by weaving end border pile warps while holding the ends of body pile warps adjacent the fell of the cloth in readiness to be woven, arresting the weaving operation, placing the end of the body pile warps on the cloth in overlapping relation with the fell of the cloth, securing the body pile warp ends to the cloth at the fell, severing the end border pile warps and holding the severed ends adjacent the fell of the cloth, weaving the body pile warps while holding the end border pile warps adjacent the fell of the cloth in readiness to be woven, and then cutting out the body pile warps, and reintroducing and weaving the end border pile warps.

2. A method of weaving warp-pile fabrics, characterized by weaving two sets of pile warps of different color in turn to produce fabric portions of different color, and holding one set of pile warps stationary adjacent the fell of the cloth while the other set of pile warps is being woven.

3. A method of weaving warp-pile fabrics, characterized by weaving two sets of pile warps of different character in turn to produce fabric portions of different color effect, and holding first one set and then the other set of warps adjacent the fell of the cloth.

4. A method of weaving warp-pile fabrics, characterized by weaving two sets of pile warps of different character one set of pile warps to form one portion of the fabric, of one color or effect cutting out said warps and holding the cut ends adjacent the fell of the fabric, weaving another set of pile warps to form another portion of the fabric, of a different color or effect and cutting out the second set of warps and holding the cut ends adjacent the fell of the fabric.

In testimony whereof we have signed our names to this specification.

VICTOR P. THEWLIS.
DAVID G. MELVILLE.
ROBERT A. TAYLOR.